United States Patent [19]

Wemyss

[11] 4,199,982
[45] Apr. 29, 1980

[54] LIQUID FLOWMETERS

[75] Inventor: William A. Wemyss, Great Missenden, England

[73] Assignee: Sheila Mary Wemyss, Great Missenden, England

[21] Appl. No.: 909,640

[22] Filed: May 26, 1978

[30] Foreign Application Priority Data

Jun. 2, 1977 [GB] United Kingdom ............... 23459/77

[51] Int. Cl.$^2$ .................................................. G01F 1/05
[52] U.S. Cl. ................................................... 73/229
[58] Field of Search ........................................... 73/229

[56] References Cited

U.S. PATENT DOCUMENTS

| 979,518 | 12/1910 | Larrabee | 73/229 |
| 1,056,438 | 3/1913 | Munroe | 73/229 |
| 1,190,251 | 4/1916 | Munroe | 73/229 |
| 1,235,559 | 8/1917 | De Leval | 73/229 |
| 1,799,635 | 4/1931 | Nuebling | 73/229 |
| 3,863,806 | 2/1975 | Risser, Jr. | 73/229 |

FOREIGN PATENT DOCUMENTS 984941  3/1965  United Kingdom ...................... 73/229

*Primary Examiner*—Herbert Goldstein
*Attorney, Agent, or Firm*—Irvin A. Lavine

[57] ABSTRACT

A fluid flowmeter comprising a rotor mounted in a chamber for rotation about a predetermined axis of the chamber by flow of fluid through the chamber. The fluid enters the chamber in use at or near both poles of the axis in a plurality of separate flows parallel to and including the polar axis and leaves the chamber at an equatorial region of the chamber relative to the axis. The rotor is supported during movement in the chamber solely by means of fluid flow there through. The flowmeter is further provided with means for sensing the rate or amount of rotation of the rotor without physical contact therewith.

20 Claims, 14 Drawing Figures

LIQUID FLOWMETERS

BACKGROUND OF THE INVENTION

This invention relates to liquid flowmeters.

SUMMARY OF THE INVENTION

As seen from one aspect of the invention there is provided a fluid flowmeter comprising a rotor adapted and arranged to be rotated in a chamber about a predetermined axis of the chamber by flow of fluid through the chamber, the fluid entering the chamber in use at or near both poles of the axis in a plurality of separate flows parallel to and including the polar axis and leaving the chamber at an equatorial region of the chamber (relative to the axis), the rotor being adapted to be supported in the chamber solely by the fluid flow, and means for sensing the rate or amount of rotation of the rotor without physical contact with the rotor.

Preferably the chamber is provided with a substantially continuous annular equatorial outlet for the fluid.

The rotor is provided with flow channels on or in the rotor for inducing rotation in the rotor, the flow channels being adapted to maintain or tend to maintain the rotor in a predetermined orientation relative to the axis of the chamber during use.

Alternatively the rotor may be generally a body of revolution other than a sphere, apart from flow channels on or in the rotor for inducing rotation in the rotor.

The flowmeter may include means to swirl the fluid about said axis so as to cause the rotation of the rotor.

The means for sensing the rate or amount of rotation of the rotor may comprise a magnet, or a ferrite, or a black patch, or a coil, forming part of the rotor and an inductive or photo pick-up for sensing the rotation of the magnet, ferrite, black patch or coil.

BRIEF DESCRIPTION OF THE DRAWINGS

The invention will be described by way of examples with reference to the accompanying drawings, wherein.

DETAILED DESCRIPTION OF PREFERRED EMBODIMENTS

Figure 1:
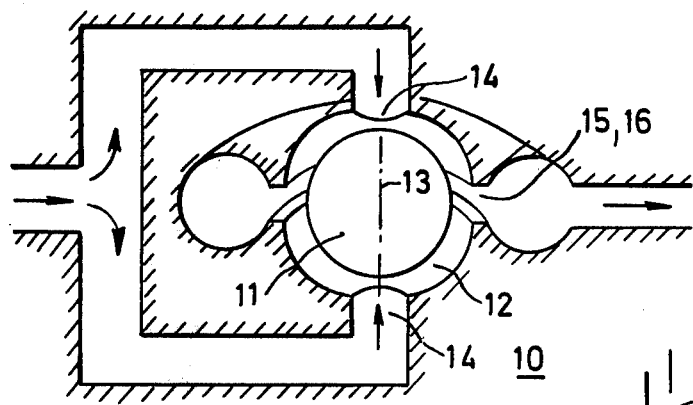
FIGS. 1 and 2 are diagrammatic illustrations of two embodiments of the invention.
Figure 2:
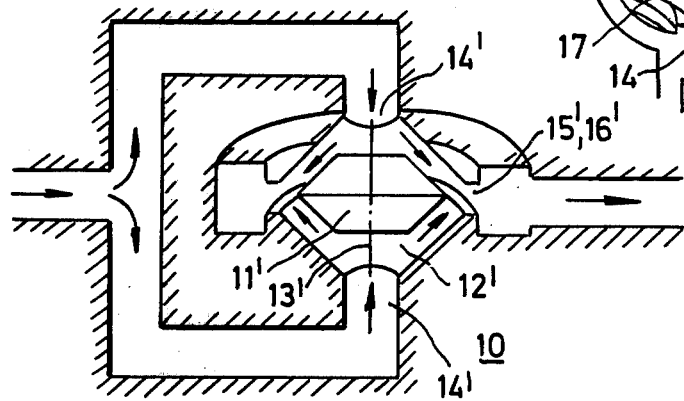

Each of the embodiments of FIGS. 1 and 2 is a fluid flowmeter 10,10' comprising a rotor 11,11' adapted and arranged to be rotated in a chamber 12,12' about a predetermined vertical axis 13,13' of the chamber 12,12' by flow of fluid through the chamber 12,12', the fluid entering the chamber 12,12' in use at or near both poles 14,14' of the axis 13,13' in two separate flows parallel to and including the polar axis and leaving the chamber at an equatorial region 15,15' of the chamber 12,12' (relative to the axis 13,13'), the rotor 11,11' being adapted to be supported in the chamber 12,12' solely by the fluid flow, and means (not shown) for sensing the rate or amount of rotation of the rotor 11,11' without physical contact with the rotor 11,11'.

In each of the embodiments of FIGS. 1 and 2, the chamber 12,12' is provided with a substantially continuous annular equitorial outlet 16,16' for the fluid at the equatorial region 15,15'.

Figure 3:
FIG. 3 illustrates the rotor and part of the chamber of the embodiment of FIG. 1.

In the embodiment of FIGS. 1 and 3, the rotor 11 is generally spherical, apart from flow channels 17 on or in the rotor 11 for inducing rotation in the rotor 11. The flow channels 17 are adapted to maintain or tend to maintain the rotor 11 in a predetermined orientation relative to the axis 13 of the chamber 12 during use.

The flow of the fluid is over the rotor 11 and couples into the vanes formed by the grooves 17 and so rotates the rotor. The angle of the vanes is a main requirement for rotation although depth of the grooves to provide vanes is also important. The grooves have a depth which increases towards the poles 14 relative to the equator i.e. near the equatorial region 15. The increase in depth towards the poles allows a constant amount of fluid through the vanes provided by the grooves 17, as the area reduces. As the velocity of the rotor increases towards the equator less depth of vane or groove is necessary. The speed of rotation of the motor 11 is proportional to the speed of flow of the fluid.

The means for sensing the rate or amount of rotation of the rotor may comprise a permanent magnet, a ferrite, or a single turn of wire within the rotor 11, or a black visible patch on the surface of the rotor 11. The black or white patch serves to show contrast on the rotor 11. According to what is provided on or in the rotor 11, a stationary pick-up may comprise an external coil for sensing a change of inductance due to the ferrite, or rotation of the permanent magnet or the turn of wire, or an infra-red or visible photo-detector for sensing the black patch.

It is conceivable that a mechanical pick-off or a simple ultra-sonic detector might alternatively be used.

The rotor 11' of FIG. 2 is a body of revolution like two truncated cones joined together base-to-base, with similar grooves (not shown) to the grooves 17 in rotor 11 of FIG. 3.

Figure 4:
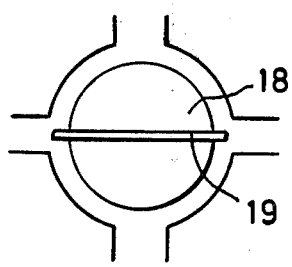
FIGS. 4 to 14 illustrate modifications.

The rotor 18 of FIG. 4 is similar to the rotor 11 of FIG. 3 (although the grooves 17 are not illustrated in FIG. 4) but the rotor 18 has a central divider 19 for assisting in the smooth flow of fluid.

Figure 5:
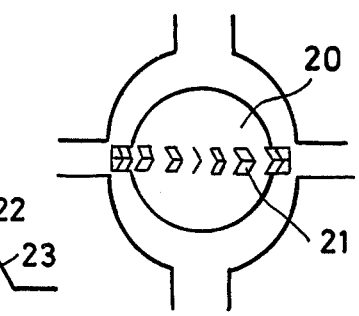

In the embodiment of FIG. 5, the rotor 20 is again similar to the rotor 11, its grooves not being shown, however but the rotor 20 is provided with turbine blades 21 on its equator.

Figure 6:
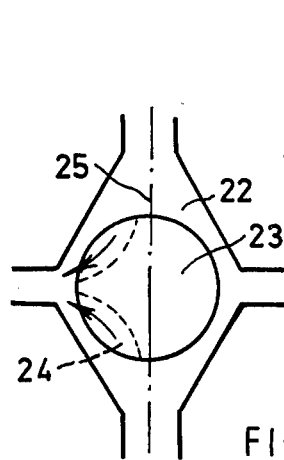

The embodiment of FIG. 6 shows a different shape of chamber 22 and a rotor 23 with differently shaped grooves 24 indicated by dotted lines. The arcuate shape of the grooves 24 in the rotor 23 should have a considerable stabilising effect for maintaining the rotor in a predetermined orientation relative to the axis 25 of chamber 22.

The rotor 23 of FIG. 6 may be substituted for the rotor 11 in the embodiment of FIG. 1.

Figure 7:
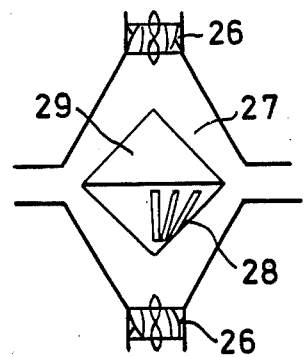

FIG. 7 illustrates a modification in which stationary blades 26 at the inlets of chamber 27 serve to swirl the fluid flow in the chamber 27. Accordingly, the grooves 28 on rotor 29 are straight, so that the rotor 29 is rotated by the swirling fluid.

Figure 8:
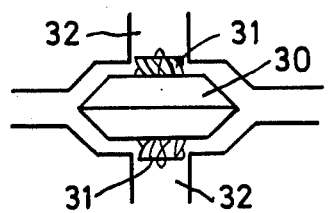

The embodiment of FIG. 8 has a rotor 30 which is similar to the rotor 11' of FIG. 2, save that the rotor 30 has no grooves, but has turbine blades 31 at the top and bottom adjacent the inlets 32 for the fluid.

Figure 9:
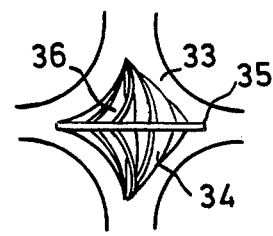

The embodiment of FIG. 9 is similar to the other embodiments, but illustrates how a flow chamber 33 need not be spherical. The flow chamber 33 is a shape of revolution having a cross-section as shown in FIG. 9, with four "inverted" quadrants of a circle. The rotor 34 in FIG. 9 has a divider 35 rather like the divider 19 of FIG. 4, and turbine blades 36 shaped as shown in FIG.

Figure 10:
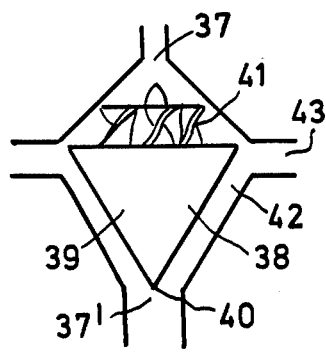

9. The rotor 34, like some others of the rotors 11,11', 18, 20, 23, 29 and 30, is self-cleaning. The rotor 34 is illustrated as a possible example, but is not preferred to the rotor 11 of FIG. 3. The rotor 11 of FIG. 3 is the preferred shape of rotor. Referring to FIG. 10 the flow through the upper inlet 37 is less than the flow through the larger, lower inlet 37'. A rotor 38 takes the shape of a cone 39 with its apex 40 adjacent the bottom inlet 37', and with turbine blades 41 adjacent the upper inlet 37. The chamber 42 may be either triangular in section (as shown) or spherical. An annular outlet 43 is nearer the inlet 37 than the inlet 37'. It has been found that asymmetrical flow is permissible and that the rotor 38 does not touch the sides of the chamber 42.

Figure 11:
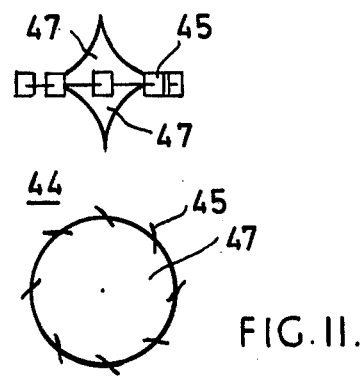

The rotor 44 of FIG. 11 (which comprises two views) is extremely simple and has blades 45 which are of the same shape, that is to say, they appear left and right-handed whether you look from the top or the bottom of the rotor 44. The embodiment of FIG. 11 illustrates the use of radial flow at the equator of the rotor 44 for rotating the rotor 44, as in the embodiments of FIGS. 12 and 13.

Figure 12:
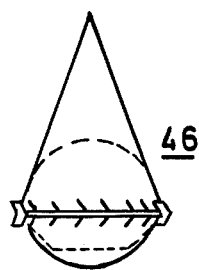

The embodiment of FIG. 12 shows the possibility of part of the rotor 46 being hemispherical, conical, a truncated hemisphere or a truncated cone. The rotor 46 may be assymmetric, that is to say, different above its equator to what it is below, or symmetrical. In other words, the rotor might take the form of two cones, which would be symmetrical, or a cone and a hemisphere, for example, which would be assymmetrical.

Figure 13:
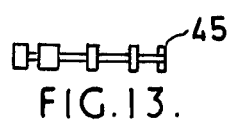

The embodiment of FIG. 13 has the same blades 45 as the embodiment of FIG. 11, but lacks the cones 47 of the embodiment of FIG. 11.

Figure 14:
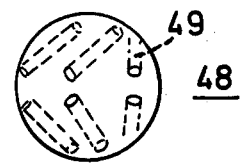

The embodiment of FIG. 14 is a rotor 48 having holes 49 in place of the grooves of the rotor of FIG. 3.

In operation of any of the embodiments, the rotor is self-centering and self-orienting. That is to say, as soon as the fluid starts to flow, and the rotor starts to move, the rotor takes up the correct position in the chamber. In each case, the speed of rotation of the rotor is proportional to the rate of flow through the device.

As soon as the rotor is raised by the fluid flow it will start to move taking up its correct position in the chamber. Bouyancy of the rotor can either be positive, zero or negative.

I claim:

1. A fluid flowmeter comprising a chamber, a rotor adapted and arranged to be rotated in said chamber about a predetermined axis of said chamber by flow of fluid therethrough, the fluid entering the chamber in use at or near both poles of the axis in a plurality of separate flows parallel to and including the polar axis of said rotor and leaving the chamber at an equatorial region of the chamber relative to said axis, said rotor being adapted to be supported in the chamber solely by fluid flow and being provided with flow channels on or in the rotor for inducing rotation of the rotor, said flow channels being adapted to maintain or tending to maintain the rotor in a predetermined orientation relative to the axis of the chamber during use, and means for sensing the rate or amount of rotation of the rotor without physical content therewith.

2. A flowmeter as claimed in claim 1 wherein said chamber is provided with a substantially continuous annular equitorial outlet for said fluid.

3. A fluid flowmeter as claimed in claim 2 wherein said rotor is spherical, and said chamber is circular in cross-section.

4. A fluid flowmeter as claimed in claim 3 wherein the rotor has a central devider for assisting in the smooth flow of fluid around said rotor.

5. A fluid flowmeter as claimed in claim 4 wherein said rotor is provided with turbine blades on its equator.

6. A fluid flowmeter as claimed in claim 5 wherein said channels are arcuate.

7. A fluid flowmeter as claimed in claim 2 wherein said rotor is spherical and said chamber is triangular and cross-section.

8. A fluid flowmeter as claimed in claim 2 wherein said rotor is in the shape of two cones joined base to base mounted in a chamber which is triangular in cross-section to substantially correspond to the shape of the rotor.

9. A fluid flowmeter as claimed in claim 8 provided with swirl means in the form of stationary blades positioned at the inlets of said chamber and serving to swirl the fluid flow therein.

10. A fluid flowmeter as claimed in claim 9 wherein said channels are straight so that said rotor is rotated by the swirling fluid.

11. A fluid flowmeter as claimed in claim 1 wherein said chamber is non-spherical and is in a shape of revolution having a cross-section in the form of four "inverted" quadrants of a circle.

12. A fluid flowmeter as claimed in claim 1 having variably sized inlets for the fluid, said rotor being cone shaped with its apex position adjacent the larger sized bottom inlet to the chamber.

13. A fluid flowmeter as claimed in claim 12 wherein turbine blades are mounted on the rotor adjacent the upper narrower inlet opposite the chamber.

14. A fluid flowmeter as claimed in claim 13 wherein said chamber may be either triangular or spherical in section.

15. A fluid flowmeter as claimed in claim 1 wherein said rotor is double-cone shaped with equilaterally situated blades to provide radial flow at the equator of said rotor.

16. A fluid flowmeter as claimed in claim 1 wherein said rotor is assymetrically shaped with respect to its equator.

17. A fluid flowmeter as claimed in claim 16 wherein said rotor is formed of a cone and a hemisphere.

18. A fluid flowmeter as claimed in claim 4 wherein said rotor is provided with holes therethrough for inducing rotation thereof.

19. A fluid flowmeter as claimed in claim 1, wherein said rotor comprises two truncated cones joined base to base.

20. A fluid flowmeter as claimed in claim 19, wherein turbine blades are provided at the top and bottom of said rotor adjacent the inlet for fluid to said chamber to constitute said flow channels on said rotor.

* * * * *